May 30, 1967 C. F. HADLEY ETAL 3,323,104

HYBRID COMPUTER TO MAKE DYNAMIC AND STATIC SEISMIC RECORD CORRECTIONS

Filed Oct. 15, 1964

4 Sheets-Sheet 1

CHARLES F. HADLEY
RALPH A. LANDRUM
INVENTORS

BY Paul F. Hawley

ATTORNEY

CHARLES F. HADLEY
RALPH A. LANDRUM
INVENTORS

BY Paul F. Hawley

ATTORNEY

CHARLES F. HADLEY
RALPH A. LANDRUM
INVENTORS

BY Paul F. Hawley

ATTORNEY

CHARLES F. HADLEY
RALPH A. LANDRUM
INVENTORS

BY Paul F. Hawley

ATTORNEY 3,323,104

HYBRID COMPUTER TO MAKE DYNAMIC AND STATIC SEISMIC RECORD CORRECTIONS

Charles F. Hadley and Ralph A. Landrum, Tulsa, Okla., assignors to Pan American Petroleum Corporation, Tulsa, Okla., a corporation of Delaware Filed Oct. 15, 1964, Ser. No. 404,055
4 Claims. (Cl. 340—15.5)

This invention relates to the field of apparatus for making time corrections on communicated signals. It has particular use when one wishes to eliminate differences in time among received signals due to the location of signal receptors at several different locations. By its use, one may produce corrected signals either subsequent to, or at the time the signals are arriving. There is automatic compensation for both location and for any other systematic time difference characterizing one reception point compared to another. The invention is not limited to, but finds particular application in, automatic correction systems for seismic geophysical propspecting, and will be described in connection with that application. Its use in other related fields of communications will be apparent to those skilled in this art.

It is an object of the invention to provide automatic time compensation for signals to compensate for systematic variations in receiving time in the signals. This system basically provides means for automatically delaying the reproduction of generated signals (a) to compensate for fixed differences in time and (b) to compensate for varying, logically related time differences.

The invention is illustrated by the attached figures which show the application of the invention in seismic prospecting. In these figures.

In one form of seismic prospecting (see FIG. 1) a source of seismic waves is located at or slightly below the depth of the water table 11 beneath the surface 12 of the earth. A plurality of detectors or geophones, $S_1$ to $S_{10}$, are shown adjacent the surface 12 and arranged in some geometric configuration or "spread." The geophones are connected through some form of communication network, not shown for simplicity, so that the signals due to movement of the earth's surface from source 13 may be amplified and recorded. Such recording is advantageously done in the form of a reproducible record, usually on a strip of magnetic film with the traces from the various geophones in side-by-side relationship.

Figure 1:
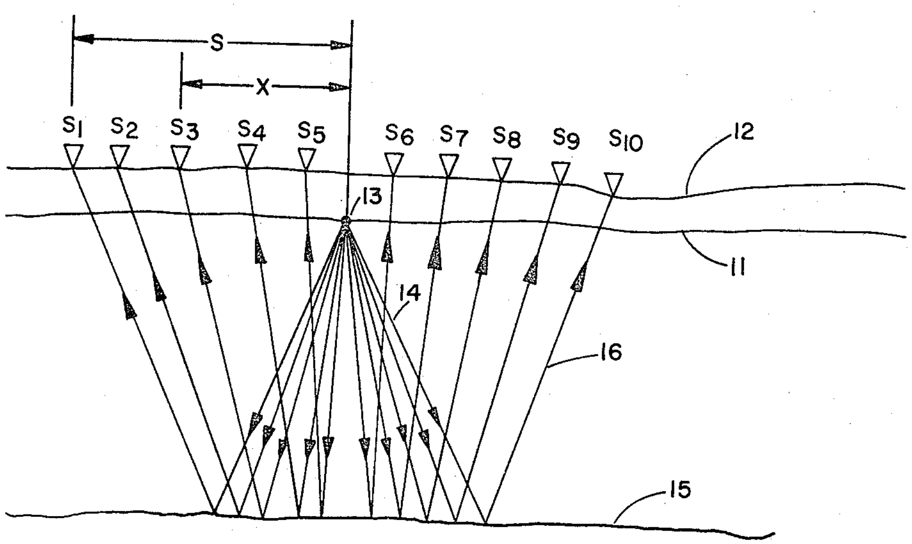
FIGURE 1 shows in diagrammatic form a cross section of the earth's crust showing a shot point and a series of geophones, together with certain of the ray paths of seismic compressional waves from the shot point to the geophones.

When the source 13 is actuated, seismic waves from this source travel down through the so-called unweathered layer (below water table 11), as shown by the downward pointing ray paths, such as path 14. At each geological interface, such as interface 15, at which there is a change in the acoustic impedance or elastic properties of the formation, part of the seismic energy will be refracted into the formation below interface 15 and part will be reflected to the surface in accordance with Snell's Law. Such a ray path is, for example, designated by numeral 16. Reflected waves generally arrive at the geophones $S_1 \ldots S_{10}$ with only small differences in time, since the travel times for the seismic waves along the ray paths shown in FIGURE 1 is approximately the same. Obviously in the case of horizontal beds and an approximately horizontal surface 12, a particular seismic wave will arrive first at geophones $S_5$ and $S_6$ and last at geophones $S_1$ and $S_{10}$. It is important to recognize these waves as representing a reflection from a subsurface discontinuity 15, since there are other seismic waves, not shown, resulting from refraction and direct transmission from the seismic source 13 to the various geophones, and other sources of seismic energy, all of which produce undesirable signals at the geophones, collectively referred to as seismic noise. It is desirable to enhance the signals corresponding to the reflected waves compared to the seismic noise, i.e., to increase the signal-to-noise ratio, so that the detection of seismic reflections from subsurface layers may be accomplished and the corresponding travel times determined from which the depth and dip of the reflecting discontinuities can be determined. For this purpose, it would be desirable, if time and expense did not prohibit the practice, to generate a source of seismic waves beneath each individual geophone. This would insure that the reflected ray path would be substantially perpendicular to the reflecting interface and would eliminate the small time differences of arrival at the various geophones in the spread due to the fact that they are not located immediately adjacent the seismic source. Computation from the records would thus be inherently simplified.

Substantially the same result can be obtained, however, if, as is currently the practice, the signals from the various geophones are recorded on a reproducible record as a plurality of tracks on the reproducing medium corresponding to the locations of the various geophones in the spread. When this reproducible record is played back, it is possible by means of this invention to delay the reproduction of the signal corresponding to a geophone (such as $S_5$) systematically relative to the signal from a geophone, such as $S_3$, so that a reflection from a common subsurface interface appears simultaneously in the two channels. Our invention accomplishes this by delaying each reproduced signal in accordance with the normal moveout correction. The normal moveout correction $\Delta T$ is defined as the difference in travel time for a reflected seismic wave corresponding to the distance $x$ to a geophone position with respect to the corresponding reflected seismic wave passing through source 13. If the average velocity of the reflected seismic wave from source 13 to the interface 15 and back to the geophone is called $v$, the well-known relationship between the vertical travel time T and the normal moveout correction (for a horizontal surface 12 and a horizontal interface 15) is given by the equation $$(\Delta T)^2+2(\Delta T)T-(x/v)^2=0 \quad (1)$$

Frequently it is useful to introduce the maximum spread length $s$ (see FIGURE 1) which is the horizontal distance from the farthest geophone to the seismic source 13. In this case, the Equation 1 becomes $$(\Delta T)^2=(x/s)^2\cdot(s/v)^2-2(\Delta T)T \quad (2)$$

The invention provides for the relative elimination of $\Delta T$ by reproducing the signals for each geophone at specified times relative to a geophone at the shot point 13 so that all effects of normal moveout are simultaneously cancelled. This accomplishes the desirable results of locating in effect the seismic source 13 substantially vertically below each recording geophone, or group of geophones, in the spread.

The second source of time difference in the reflected seismic wave paths results from the fact that the thickness of weathered layer (between the surface 12 and the water table 11) may be different at various geophone locations along the spread. In FIGURE 1, for example, a pronounced difference in thickness of weathered layer is shown for $S_{10}$ compared to $S_9$. Accordingly, a reflected seismic signal arrives at $S_{10}$ earlier than it would if weathering were uniform. It is desirable to eliminate this time difference. This time difference is determined in any of a number of known procedures (forming no part of this invention) and a correction, called the weathering correction, is applied to compensate for this difference. It is a further object of this invention to make the weathering correction automatically. Such compensation can be applied whether the time difference is due to a change in weathering thickness or a constant time lag in a seismic amplifier or the position of a recording head, etc. It is to be understood that this constant time correction is to be applied, regardless of the travel time of the reflected seismic wave, whereas, the correction due to normal moveout, as shown by equations 1 and 2 varies with the travel time T, being large at small travel times and small at large travel times.

Figure 2:
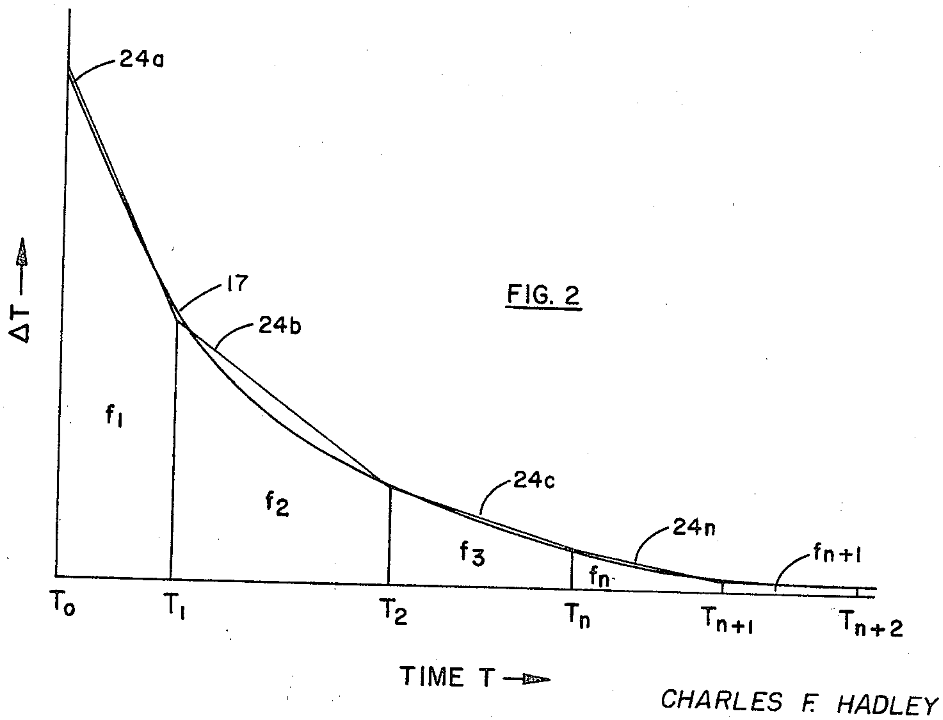
FIGURE 2 is a chart of time differences in reception of waves at one point, together with certain algebraic conclusions used in this invention.

The normal moveout correction ΔT for one particular spread length $x$ and velocity $v$ is plotted as a function of the travel time T in curve 17 of FIGURE 2. This illustrates the essential nature of this curve and shows that it is necessary to vary the normal movement correction, decreasing ΔT as T increases. In conventional seismic prospecting, as carried out in the absence of this invention, it is customary to record each geophone or geophone group as a separate reproducible signal on, for example, a magnetic tape in a side-by-side relation with the signals from all other geophones or geophone groups. The field tape is then sent to a playback center where the tape is placed on a drum to move it by a plurality of pickup heads corresponding to the number of traces to be reproduced. The drum is rotated in the reproduction process at a constant angular velocity. The pickup heads are angularly oriented with respect to each other with the head corresponding to a particular spread length $x$ (and corresponding normal moveout ΔT) advanced so that the normal moveout is eliminated. Thus, at the initial part of the record the pickup heads are oriented with the heads on the traces corresponding to the remote geophones picking up the signal from the magnetic tape earlier than those corresponding to the geophones located adjacent the center of the spread. The angular orientation angle $\theta$ for a head is given by $\Delta T/\omega$ where $\omega$ is the angular velocity of the drum. A mechanical arrangement is used to change the angular orientation of the pickup heads during the rotation of the drum to decrease ΔT with time in accordance with the change in ΔT as shown by curve 17.

A second angular orientation is provided in the playback center to provide weathering correction. This simply consists of displacing a pickup from its normal position as dictated by the normal moveout correction by an angular difference just sufficient to compensate for the time difference equal to the weathering correction. This part of the angular orientation is maintained constant throughout the reproduction from the magnetic tape since, unlike the normal moveout correction, this time difference is constant throughout the record.

While this system works satisfactorily, it requires extreme attention to make sure that no operator error will introduce mistakes in the reproduction process. Also, it requires a considerable amount of time to make these corrections. Third, the mechanical arrangement for accomplishing the normal moveout correction (since it varies throughout the recording period) is complicated, requiring constant adjustment and maintenance. Finally, it is known that the seismic velocity $v$ involved in the normal moveout correction is not a constant but increases in arbitrary fashion determined by the speed of the seismic waves through the unweathered formations. Changes in elastic characteristics of the formations give rise to variations in the normal moveout correction which cannot be compensated easily by the complicated mechanical arrangements used to effect this correction.

At the present time it is also recognized that an alternative system of original recording offers considerable computational advantages. In this system the original seismic wave is recorded not as a smoothly varying signal but as a sequential set of digits, each set corresponding to the amplitude of the seismic signal at one of a large plurality of times throughout the recording period. This is called digital recording. One advantage of such a system is that it eliminates the effects of distortions in recording media, such as nonproportional recording of amplitude, or errors in the speed of the recording medium past the recording heads. However, when digital recording is used the corrections for normal moveout and for weathering are accomplished with much greater difficulty in the conventional reproduction system than when using our invention.

Figures 3, 4:
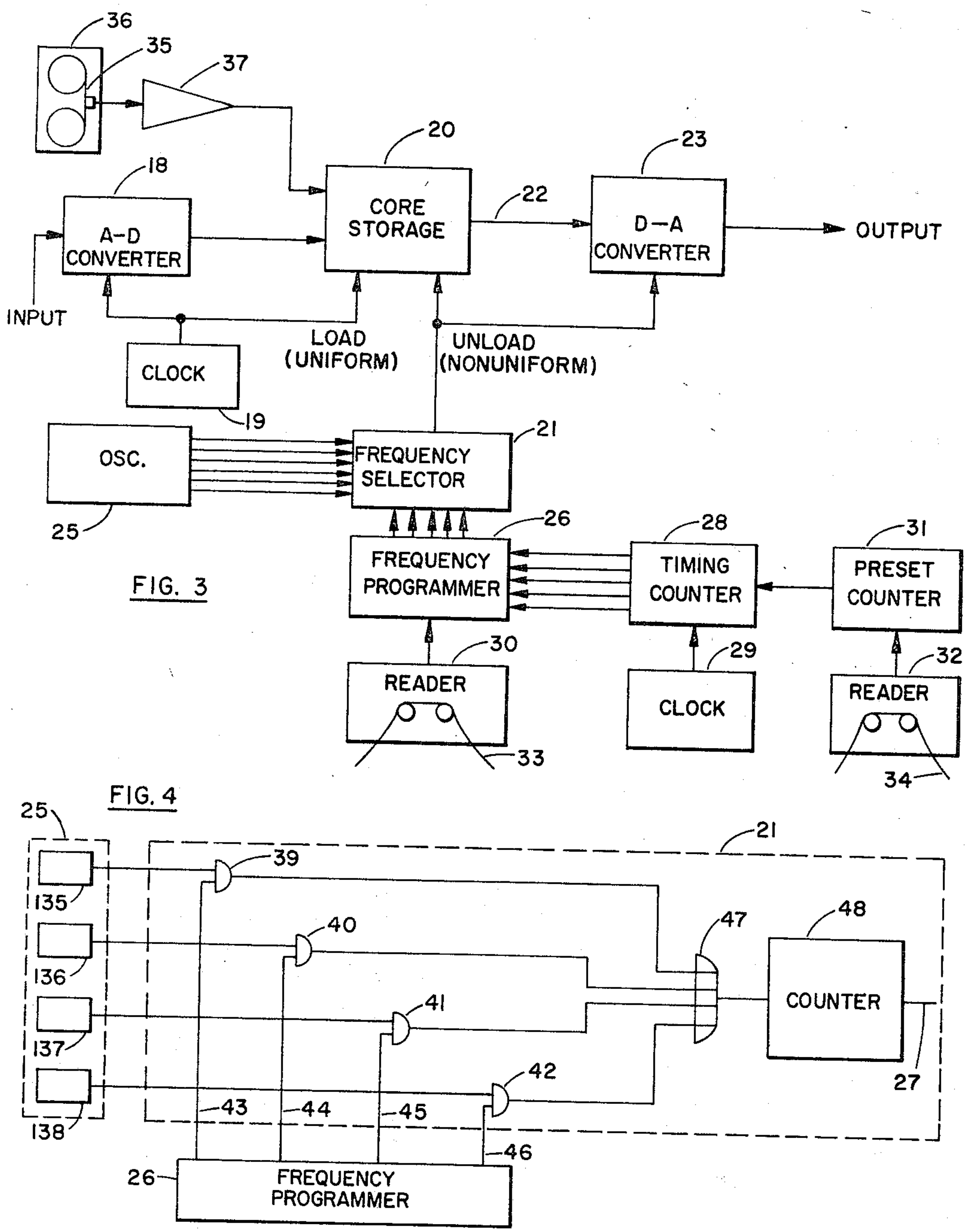
FIGURE 3 is a block diagram of an assemblage of apparatus satisfactory for use in one form of this invention.
FIGURES 4 to 6 are block diagrams of portions of the circuits shown generally in FIGURE 3.

The basic arrangement of the system in accordance with our invention is shown in FIGURE 3. It deliberately makes use of signals which have been digitized, that is, in which an analog-to-digital converter has been used. Many such types of converters are known, one type being shown, for example, on pages 491–494 of the text "Pulse and Digital Circuits" by Jacob Millman and Herbert Taub, McGraw-Hill Book Company, 1956. This converter produces at periodic intervals a signal composed of a set of bits of information in a binary-coded system determined by the amplitude of the input electrical signal at the time considered. (These times are determined by a uniformly produced pulse from a flip-flop circuit called a clock.) The digitized sets are sequentially loaded at the clock intervals into a core storage, that it, a device capable of separately storing each set of the digitized information in a reproducible form from which it can be produced, in the order stored, by an unloading signal. The unloading signal is not derived, however, from a uniform clock but from a programmed and hence selected one of a plurality of constant frequencies which, as will be shown subsequently, corresponding to a selected time interval during the original recording. Thus, the unloading from the core storage takes place at one of a plurality of frequencies chosen with relation to the normal moveout correction and varied in an automatically programmed fashion during the reproduction time so that the withdrawal rate from storage will be relatively low during the initial part of the record reproduction time and at higher rates subsequently. The output from the core storage in turn is fed to a digital-to-analog converter, if desired, or to further computational networks and then to a digital-to-analog converter which permits an output to be produced analogous to the original seismic signals but with a correction having been introduced during the storage for both the normal moveout correction and the weathering correction.

In FIGURE 3, an input signal, such as a reproduced seismic signal from a magnetic tape, is applied to an analog-to-digital converter 18 which samples the input at very precise, uniform time intervals in accordance with the pulse output from the clock circuit 19. One may use, for example, a quartz crystal-controlled oscillator followed by a Schmitt trigger circuit to generate a square wave with fast rise time. A typical crystal-controlled oscillator is described on pages 366–367 of "Transistor Electronics" by Lo, Endres, Zawels, Waldhauer, and Cheng, Prentice-Hall, 1955. The Schmitt trigger circuit is described in the book "Transistor Circuit Design" by the Engineering Staff of Texas Instruments, Incorporated, McGraw-Hill Book Company, 1963. A time precision of at least one part in 10,000 and ordinarily, one part in at least 50,000 is produced. Such time precision is necessary in seismic prospecting and is desirable in other applications of this invention.

The output of the analog-to-digital converter 18 is applied to the input of the core storage unit 20. The load pulse from the clock circuit 19 is also applied to this core storage so that each time when a coded set of bits of data from the converter 18 is present on the input to the core storage 20, the core storage automatically places the information sequentially in the next storage unit to that in which the previous set of bits was stored. Such core storage units are well-known devices in computers and elsewhere. A description of a typical unit is found in Chapter 8 of the book "Digital Computer Components and Ciricuits" by R. K. Richard, D. Van Nostrand Company, 1957. Such a unit sequentially stores the coded amplitude information coming from the converter 18 on occurrence of the load command pulse from the clock circuit 19 and unloads this information only upon occurrence of an unload command pulse from an unload signal generator, in this case, frequency selector 21. The digital information unloaded sequentially from the core storage 20 appears as an output on line 22 which as mentioned earlier may be further processed or may be applied directly as an input to a digital-to-analog converter 23. The digital-to-analog converter 23 essentially is the inverse of the converter 18. It produces a stepped electrical wave at the output, each step being precisely controlled in amplitude in direct accordance with the digital value of the corresponding signal output from the core storage 20 and occurring for a period equal to the interval between unloading pulses from unit 21. This is accomplished by having the unload pulses from unit 21 fed as the operative electrical command to both core storage 20 and digital-to-analog converter 23.

The gist of this invention consists in making the necessary time corrections on the input data to unit 18 through the blocks of apparatus driving unit 21. The seismic data has been sampled at a uniform rate, digitized and stored. This data is then unloaded at a nonuniform rate so prescribed that the data is corrected as required by the normal moveout correction curve appropriate to the particular input signal. Additionally, the weathering correction is automatically provided.

We have found that one can approximate the normal moveout curve 17 (FIGURE 2) by a number of straight line segments 24*a*, 24*b*, 24*c*, etc. The degree of approximation is determined simply by the fact that the difference in time between the true normal moveout curve 17 and the straight line segment (for example 24*a*) must be less at any time than the maximum allowable error in moveout correction. Preferably, this should be less than 0.001 second and can ordinarily be of the order of 0.0005 second. The slope of each of the straight line segments and the length of the segment are chosen by the operator with the above criterion in mind, or is automatically determined as described later. Thus, one slope for one line segment will occur between the time $T_0$ and $T_1$, a second between $T_1$ and $T_2$, and so on. It is to be emphasized in passing that the normal moveout curve ordinarily should properly take into account variations in the seismic velocity with depth as known for the particular area in which the seismic prospecting occurs. This is already known to those skilled in this art and need not be described.

For each line segment, a frequency is determined by the equation $$f_n=S\left(1-\frac{\Delta T_n-\Delta T_{n+1}}{T_{n+1}-T_n}\right) \qquad (3)$$

In this equation $f_n$ is the unload frequency to use during the *n*th time interval, i.e., between a time $T_n$ and $T_{n+1}$, corresponding to a particular line segment approximation. $\Delta T_n$ is the value of $\Delta T$ at the start of the *n*th straight line segment. $\Delta T_{n+1}$ is the corresponding time at the end of this line segment. $T_n$ is the total record time that has elapsed up to the start of this line segment and $T_{n+1}$ is the corresponding record time at the end of this line segment. S is the rate at which data was stored into the core storage 20, i.e., the fundamental frequency of the pulses from the clock circuit 19. It is seen from FIGURE 2 that there will be a plurality of frequencies $f_1$, $f_2$, $f_3$, and so on, corresponding to record times $T_0-T_1$, $T_1-T_2$, $T_2-T_3$, etc. It is apparent that $$\frac{\Delta T_n-\Delta T_{n+1}}{T_n-T_{n+1}}$$

is the time rate of change of time lag or normal moveout.

A multiple frequency oscillator unit 25 is provided. This unit generates output signals with frequencies corresponding to at least one part in 10,000 and preferably one part in 50,000 with the frequencies $f_1$, $f_2$, $f_3$, etc., as determined from FIGURE 2. Preferably all of these frequencies are fed simultaneously into the input to the frequency selector unit 21. This unit acts essentially like a controlled single-pole, multiple-throw stepping switch which selects one of the frequencies from the multiple frequency generator unit 25 in accordance with the command from the frequency programer 26 and impresses pulses of this frequency on the unload lines 27 going to the core storage 20 and the digital-to-analog converter 23. The frequency selector unit 21 switches from frequency $f_1$ at time $T_1$ to frequency $f_2$, then at time $T_2$ switches to frequency $f_3$, and so on. The control of the times $T_1$, $T_2$, etc., at which the frequency is switched between adjacent output pulses to lines 27 is determined by a timing counter 28 which in turn is actuated by an essentially uniform clock circuit 29 which may, and preferably will be, the same unit as clock circuit 19. The unloading frequencies to be used are preferably determined from a punched tape reader 30 which also feeds the frequency programer 26.

When desired, a weathering correction is made. This is accomplished by controlling the time after the initial data are loaded into core storage 20 at which the initial output is obtained on line 22. A preset counter 31 controls the initiation of the unloading operation for each trace. It obtains its data from a weathering correction tape reader 32.

The normal moveout curve data is punched on the tape 33 feeding the tape reader 30. It is to be noted that this system can be used with any normal moveout correction, whether represented by a second degree equation or one of higher degree, or by any scaling required—from time to depth scale, etc. Similarly, the data controlling the weathering correction is punched into the weathering tape 34 feeding tape reader 32. Of course, it is possible to use other sources than punched paper tape; this is simply a convenience in making automatic the operations involving the frequency selector unit 21.

In some types of systems the input data may not be a varying amplitude signal such as the input to the analog-to-digital converter 18. For example, the input to the system may already be in the form of digitized information on some type of a tape 35, such as a magnetic tape. In this case, the tape 35 is placed in a readout unit 36 which produces a sequential series of coded digital electric impulses to the input of an amplifier 37 which in turn passes these along as an input to the core storage unit 20. This unit in turn stores the digitized information at a uniform rate provided by the clock circuit 19. Corrections as to time are then provided as already indicated for the balance of the circuits shown in FIGURE 3.

The multiple frequency generator unit 25 preferably consists of a number of very stable controlled oscillators. Since each output frequency from this unit, as shown by Equation 3 corresponds to one slope of a line segment $24_n$, it is possible to use a fixed set of frequencies for all normal moveout curves, simply varying by graphical construction the length of the various line segments $24_n$, i.e., changing the time intervals $T_n - T_{n+1}$ during which a particular frequency is employed.

We prefer to use a considerable number of transistorized crystal-controlled oscillators, for example, of the type shown on pages 382–383 of "Transistor Electronics," already referred to. Available frequencies will usually be in a very high range, in which case a stable frequency divider is employed. Sine-wave synchronization of a divider of the counter type can be successfully employed, as is well known in the art. Such devices are described in Chapter 12 of the "Pulse and Digital Circuits" reference given above, particularly pages 378–386.

The frequency selector unit 21 can conveniently consist of a gate structure using "and" gates and "or" gates. Such units are well described in the "Pulse and Digital Circuits" reference on pages 294–400. As is well known, "and" gates produce an output signal only if there is a signal on all inputs. "Or" gates produce an output if there is a signal on any input.

A diagrammatic arrangement of unit 21 is shown in FIGURE 4, in connection with a multiple frequency generator 25 having in this case four crystal-controlled oscillators 135–138. Each oscillator is separately connected as an input to an and gate 39–42. The second input to each of these and gates comes in on lines 43–46 from programer 26. The outputs of all four and gates are connected to the input of a single or gate 47. Its output in turn is fed for convenience into a counter 48. This counter functions as a frequency divider, producing one output pulse for each N input pulses, where N is the counter capacity before repeating. Such counters are described in the "Pulse and Digital Circuits" reference, pages 346–352. In this instance the counter is a storage counter circuit used as a frequency divider and might, for instance, produce an output pulse for each 1024 input pulses from any of the crystal-controlled oscillators 135–138. This would divide the frequency by 1024. By making the selection of the oscillator before frequency division is employed, the effect of resolution between pulses is minimized. As long as only one of the lines 43–46 from the frequency programer 26 is energized, there will be one and only one specified frequency entering counter 48, and hence only one specified output pulse rate (at frequency $f_n$) on line 27.

Figure 5:
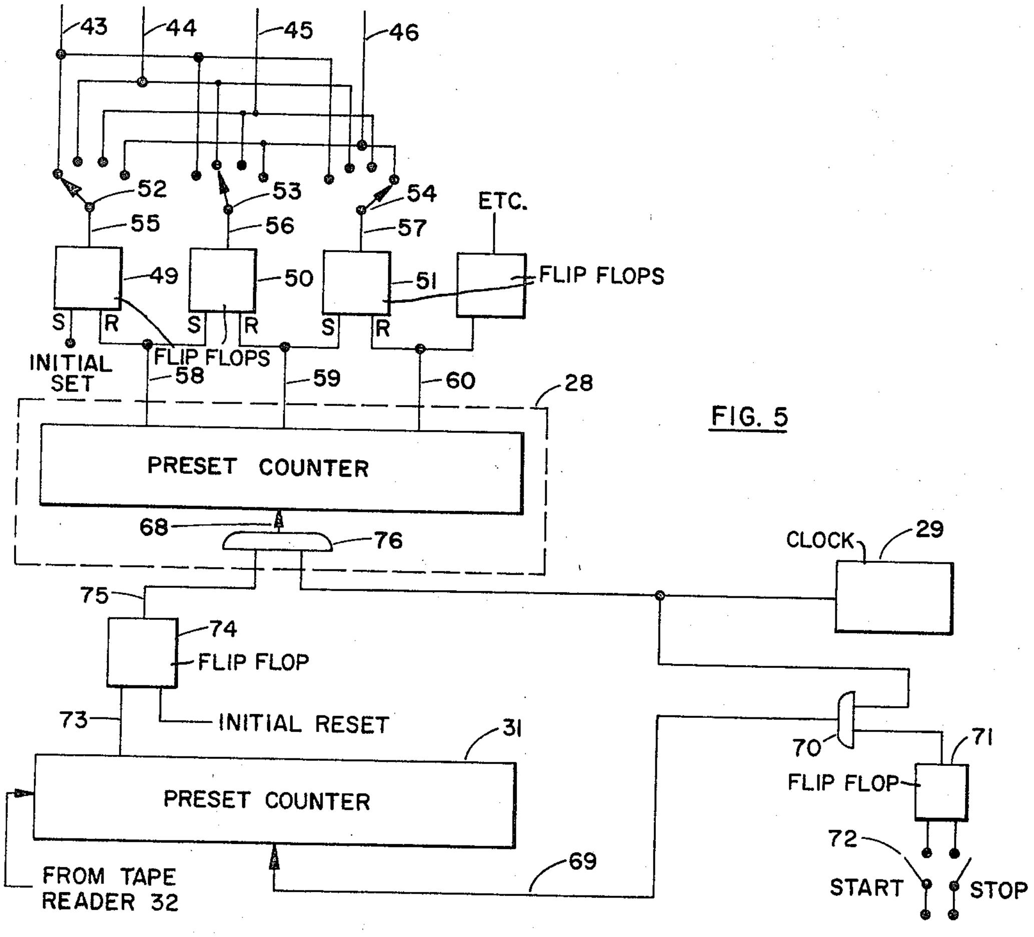

The operation of the frequency programer 26 and its control circuits is shown in FIGURE 5. Each of units 49–51, etc., is a flip-flop circuit, too commonly known to require description. The outputs of the three flip-flops 49–51 are connected to the desired leads 43–46 by switches 52–54. It is to be understood that while manual switches are shown, it is ordinarily more convenient to use a set of relays or diode switching arrangements controlled by the normal moveout tape reader 30.

Initially the flip-flop 49 has been placed in set condition to produce a signal on lead 55. The preset timing counter 28 is so arranged that a pulse will occur on lead 58. When the preset counter 28 reaches the count corresponding to time $T_1$, i.e., to the first change in the unload frequency, the pulse on lead 58 resets flip-flop 49 and thus terminates the signal on line 43. The same pulse on line 58 sets flip-flop 50 and produces a signal on line 56, thus switching on to the counter 48 (in FIGURE 4) the frequency from oscillator 36. As later selected times, such as $T_2$, etc., are reached, pulses occur on leads 59, 60, etc., actuating flip-flop 51 and later flip-flops in sequence. By this arrangement, the signals from the selected oscillators, as determined by the setting of the selector switches 52–54, determine the rates at which the core storage 20 is unloaded by the preselected oscillators in unit 25.

Figure 6:
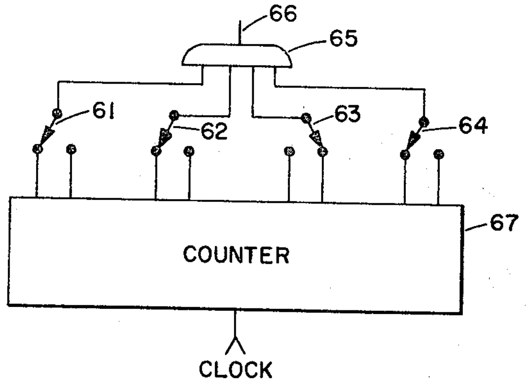

Operation of a preset timing counter is shown in greater detail in FIGURE 6. Counters may be either binary or binary-coded decimal type. The former is shown here. Each counter has a true and false output. These are connected in turn to the two positions of the double-pole, double-throw switches 61–64. The arms of these switches are fed into the respective inputs of an and gate 65. Assume that the switches are set to the positions indicated. Switch 61 will have an output if the counter output 1 is true. Switch 62 similarly has an output if the counter output 2 is true. Switch 63 has an output when the counter output 3 is false and switch 64 has an output when counter output 4 is true. There will be an output from the and gate 65 on line 66 only when all inputs are activated. This in turn requires that the count of the preset counter 67 has exactly the predetermined count determined by switches 61–64. For example, the setting in FIGURE 6 is for the binary number 1101, corresponding to the decimal number 13. A clock produces an input to preset counter 67.

The arrangement shown in FIGURE 6 is used in two ways in FIGURE 5 and FIGURE 3. Unit 26 is a preset timing counter embodying the arrangement shown in FIGURE 6, the clock in this case being the apparatus connected to lead 68. Similarly, the preset static counter 31 is another example of the circuit shown in FIGURE 6, with the clock in this case furnishing the impulses to lead 69. The clock 29 is a precision frequency source as stated above. This is fed into one input to and gate 70. The second input is the output of a flip-flop 71. When the entire unit shown in FIGURE 3 is to be turned on, the flip-flop 71 is actuated by operating the "start" pushbutton 72 actuated by a suitable source of electric energy (not shown). This sets flip-flop 71 and allows the output from the clock circuit 29 to actuate the preset counter 31. Preset counter 31 also receives data from the tape reader 32, which actuates relays setting the DPDT switches which determine the count number at which an output pulse from the preset counter 31 will occur. This specifies the starting time of the unloading operation of core storage 20, since the pulse from the output of unit 31 on line 73 sets the flip-flop 74, which in turn produces an electric signal on line 75 into the and gate 76. This occurs at a time determined by the tape 34 on tape reader 32 and hence, corresponds to a certain weathering time correction. Occurrence of a signal on line 75 permits an output from the clock 49 to go into the preset counter 28 which, as described in FIGURE 6, will cause output on lines 58–60, etc., at the selected times to cause a shift from one oscillator to another in the group 135–138 at the times $T_1$, $T_2$, etc.

It will be noted that the system illustrated in FIGURES 3 to 6 employs a different storage withdrawal rate from the storage rate, and also introduces a fixed time delay after the start of storing and before the initiation of withdrawal. This latter feature is employed so that when a plurality of signals are to be corrected (for example, the signals from a plurality of geophones involving differences in weathering time) suitable correction may be made. The initiation of withdrawal of the temporarily stored quantities in the core storage 20 occurs after the lapse of time which can vary from trace to trace. This time is a minimum for the one trace having maximum weathering correction and is correspondingly less for each of the other traces, the differences in initiation time being substantially equal to the relative time difference or weathering correction. This insures that a fixed time correction is introduced into each trace. It has already been mentioned that determining the weathering correction or its equivalent is not part of this invention. This subject is adequately discussed, for example in "Geophysical Exploration" by C. A. Heiland, Prentice-Hall, Inc., 1946, under that topic. Correction for fixed time difference is definitely a part of this invention, using the preset counter 31 and its programing elements, tape reader 32 and tape 34.

The operation of the system described thus far has been made chiefly in relation to the handling of data from one electric wave at a time. Our invention can be employed advantageously for producing timing corrections of both fixed and variable nature on a plurality of records, as, for example, the signals resulting from reception of seismic waves from a single source at a plurality of geophones. Thus, for example, one may correct the signals from the first geophone, then from second, then repeat the procedure for the next geophone or geophone set (using the appropriate normal moveout in each case). This is so-called serial operation. Parallel operation may also be employed, i.e., by the use of a multiplexer, correction of all traces may be handled substantially simultaneously. Such operation is already functionally well known. For example, the use of parallel operation is well illustrated in U.S. application 330,839, entitled "Digital Recording of Seismic Data," filed Dec. 16, 1963.

It has been pointed out that it is advantageous to use a tape 33 to make the normal moveout correction. This tape generates the appropriate electric signal feeding the switches of preset counter 31 which set the code on the output of this counter initiating a signal on line 73, as already described. This requires that a new tape section be prepared for each change in seismic velocity with depth, and for each spread length $x$. It is found that a special purpose analog computer can be used to compute the data going on this tape. The form employed depends upon the equation used to represent the compressional wave seismic velocity as a function of depth. An illustration will be made for a second-order equation. Modifications required for higher-order corrections will be apparent to those skilled in this art.

In this case the normal moveout equation is Equation 2 above. The terms in this equation can be computed by the analog computer shown in FIGURE 7. A direct voltage arbitrarily considered to represent unity is impressed across the potentiometer 100. This preferably is a linear potentiometer. It is set at the ratio $(x/s)^2$, i.e., the square of the ratio of the spread length $x$ to maximum spread length $s$. Accordingly, the voltage fed into the operational amplifier $A_1$ is $(x/s)^2$. An operational amplifier, as is well known inverts the signal, i.e., reverses its phase. In this case it produces an output voltage $-(x/s)^2$. This signal in turn is fed into a second potentiometer 101 which has been set at the ratio $(s/v)^2$. It is to be noted this ratio is common for all spread lengths. The output of the potentiometer 101 will be the product $-(x/s)^2\cdot(s/v)^2$. This is fed into one input of an adding circuit with unity gain for this input, by feeding it through an input resistance R into an operational amplifier $A_2$ with feedback resistor R. Output of $A_2$ is $(x/s)^2\cdot(s/v)^2$. Another input $\Delta T\cdot T$ is added with a gain of 2 by using a summing resistor with the value $R/2$. Thus the total output from the second operational amplifier will be the algebraic sum of the two terms, or $(x/s)^2\cdot(s/v)^2-2\Delta T\cdot T$. Equation 2 has shown that this output is equal to $\Delta T^2$. Accordingly, this output is fed into a square root circuit 103. One such square root circuit is shown, for example, on pages 74 and 75 of "Analog Computer Techniques" by C. L. Johnson, McGraw-Hill Book Company, 1956. Another is found in Pamphlet 3732 of the Donner Scientific Company, 888 Galindo Street, Concord, California. The output of this circuit is the voltage $\Delta T$. This voltage is the desired analog voltage which is read on a volt meter V and the equivalent number punched on the paper tape, or if desired, is fed into a paper tape punch volt meter which automatically codes the tape properly. This output from circuit 103 is also fed to a third potentiometer 104 which is set at the ratio T, the total travel time. The output of this potentiometer represents the product $\Delta T\cdot T$ which, as already mentioned, is fed through the summing resistor $R/2$ into the operational amplifier $A_2$. In the practical computer the potentiometer 100 is set for one ratio of particular spread length $x$ to total spread length $s$ and a whole series of outputs is obtained by systematically going through the total range of settings T on potentiometer 104. This makes the analog computation for all values of T and one value of $x/s$. The next value of $x/s$ is then systematically chosen and the procedure repeated. It is advantageous to make up the potentiometer 104 of a series of fixed resistors to form a divider operated by a stepping switch.

Figure 7:
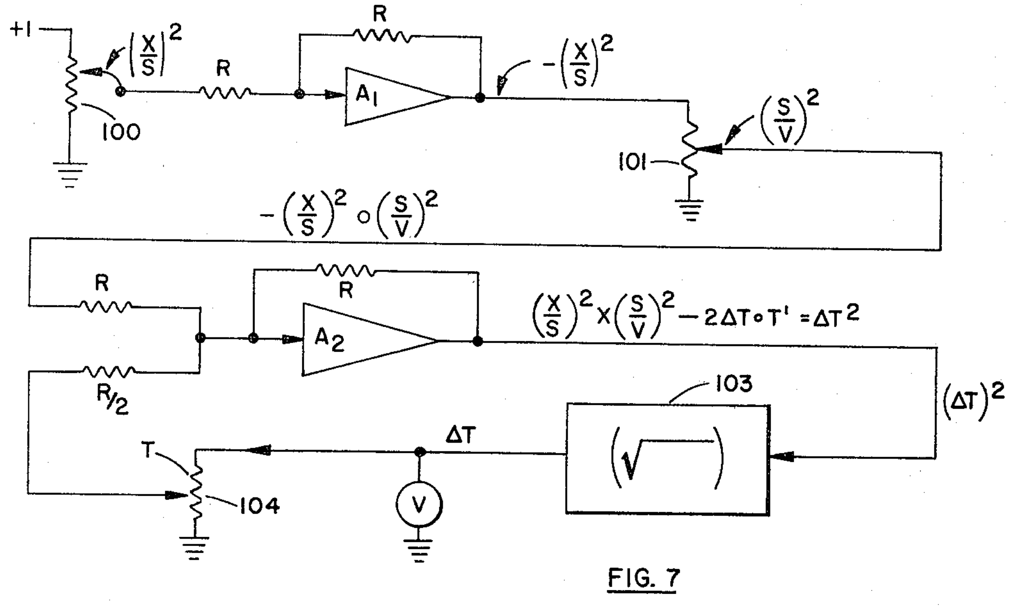
FIGURES 7 and 8 are circuit diagrams for two analog computers which can be used in connection with this invention.
Figure 8:
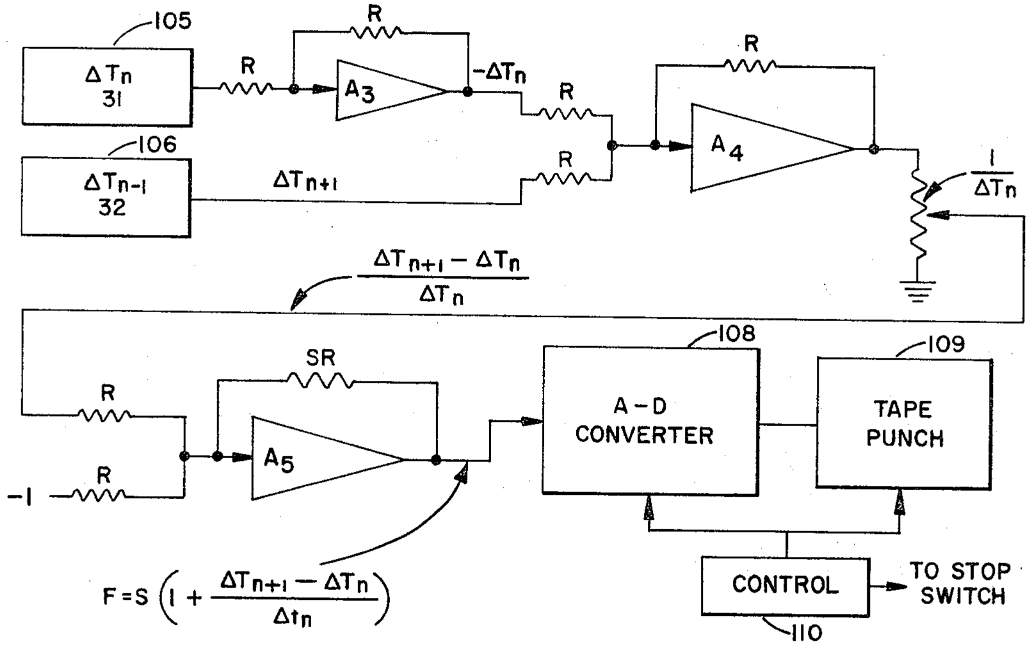

It is possible to compute the necessary unload frequencies $f_n$ by using two $\Delta T$ computers of the type shown in FIGURE 7. The over-all computer is shown in block diagram form in FIGURE 8. One $\Delta T$ computer 105 of the type shown in FIGURE 7 is arranged to compute $\Delta T$ at a time $T_n$. The second $\Delta T$ computer 106 of the same type furnishes an output $\Delta T$ at a time $T_{n+1}$. The output from the computer 106 is directly fed into an operational amplifier $A_4$. The output from computer 105 is fed into an operational amplifier $A_3$ which produces the output $-\Delta T_n$. Both outputs are summed by operational amplifier $A_4$ to produce an output $-(\Delta T_{n+1}-\Delta T_n)$. The output of $A_4$ is fed into potentiometer 107 which has been set at the ratio $1/\Delta T_n$. Thus, the potentiometer output is $$-\left(\frac{\Delta T_{n+1}-\Delta T_n}{\Delta T_n}\right)$$

This is fed into the operational amplifier $A_5$. However, the feedback resistor on operational amplifier $A_5$ is equal to SR. Additionally, a unity negative voltage (i.e., equal to $-1$ is also fed through a summing resistor into the input of operational amplifier $A_5$. The use of a feedback resistor SR in this case is well known to produce an output S times as large as that which is produced with a feedback resistor R. Accordingly, the output from operational amplifier $A_5$ is equal to $$S\left(1+\frac{\Delta T_{n+1}-\Delta T_n}{\Delta T_n}\right)$$

Thus, the voltage output is the desired quantity $f_n$. This can be measured by a volt meter, as described in connection with FIGURE 7, and a corresponding punched tape code prepared. However, in FIGURE 8, another form of output is illustrated. The voltage $A_5$ is shown feeding an analog-to-digital converter 108 which is fed into an automatic paper tape punch 109. A control circuit 110 is used to actuate the analog-to-digital converter 108 and the tape punch 109, as desired. This control circuit can also, if desired, actuate stepped switches as described above in each $\Delta T$ computer as shown in FIGURE 7.

It is apparent that numerous modifications of the time correction system shown may be made. The specific items of equipment discussed may be replaced by others having the same function. The invention is not to be considered limited by such items but is best described in the appended claims.

We claim:

1. In apparatus for correcting a signal for time lag due to reception of said signal at a location removed from the source of said signal, said time lag being a known time function with a single rate of change at each value of time, and in which the amplitude of said signal is repeatedly sampled at substantially equal time intervals and a quantity proportional to each such sampled amplitude is temporarily and individually stored in sequence in a core storage unit, the improvement comprising (1) a plurality of substantially fixed-frequency oscillators each of a different frequency, (2) a frequency selector unit for connecting each of said plurality of oscillators alone and in sequence from highest to lowest frequency to said core storage unit to unload the quantities stored in said storage unit in sequence, and at a rate determined by the frequency of the connected oscillator, and (3) means for controlling the switching sequence of said frequency selector unit as a predetermined function of time, whereby the sample rate of withdrawal is directly related to said time lag.

2. In apparatus for correcting a signal for time lag due to reception of said signal at a location removed from the source of said signal, said time lag being a known time function with a single rate of change at each value of time, and in which the amplitude of said signal is repeatedly sampled at substantially equal time intervals and a quantity proportional to each such sampled amplitude is temporarily and individually stored in sequence in a core storage unit, the improvement comprising (1) a plurality of substantially fixed-frequency oscillators each of a different frequency, (2) a frequency selector unit for connecting each of said plurality of oscillators alone and in sequence from highest to lowest frequency to said core storage unit to unload the quantities stored in said storage unit in sequence, and at a rate determined by the frequency of the connected oscillator, and (3) a control of said frequency selector unit, said control causing said oscillators to be connected in sequence to unload said stored quantities only in a succession of time intervals during each of which the unloading rate is directly proportional to the quantity one minus the average value of said rate of change during the corresponding time interval.

3. Apparatus for correcting a signal for time lag due to reception of said signal at a location removed from the source of said signal, said time lag being a known time function with a single rate of change at each value of time comprising (1) an analog-to-digital converter, (2) a core storage adapted to store the output of said converter, said core storage having an unloading control, (3) a clock driving both said converters and said core storage to sample and store quantities proportional to an input signal presented to said converter in sequence and at substantially uniform time intervals, (4) unloading means for removing stored quantities in said core storage at a plurality of successive different rates, each being uniform during an interval of time and each rate being less than the proceeding value, including (a) a plurality of substantially fixed-frequency oscillators, each of different frequency from all others, (b) a frequency selector unit for connecting in turn each of said oscillators (in descending order of frequency) to said unloading control of said core storage, and (c) a timing counter connected to said frequency selector unit for controlling the time intervals between switching of each oscillator and the succeeding oscillator of said plurality of oscillators in a predetermined time pattern, whereby the sample rate of withdrawal is directly related to said time lag, and (5) a digital-to-analog converter controlled by the one of said plurality of oscillators actuating said unloading control, and driven by the output of said core storage to produce an output of said signal corrected for said time lag.

4. Apparatus in accordance with claim 3 including a preset counter connected to said timing counter for controlling the time after the initial data are loaded into said core storage at which initial output is obtained from unloading of said core storage.

References Cited

UNITED STATES PATENTS

| | | | |
|---|---|---|---|
| 2,994,851 | 8/1961 | Bucy et al. | 340—15.5 |
| 3,134,957 | 5/1964 | Foote et al. | 340—15.5 |
| 3,156,892 | 11/1964 | Woods et al. | 340—15.5 |
| 3,175,182 | 3/1965 | Woods | 340—15.5 |

BENJAMIN A. BORCHELT, *Primary Examiner.*

R. M. SKOLNIK, *Assistant Examiner.*